United States Patent
Lin et al.

(10) Patent No.: US 10,890,646 B2
(45) Date of Patent: Jan. 12, 2021

(54) METHOD FOR DETECTION OF A NARROWBAND POSITIONING REFERENCE SIGNAL (NPRS) LOCATION IN A RADIO FRAME

(71) Applicant: Telefonaktiebolaget LM Ericsson (publ), Stockholm (SE)

(72) Inventors: Xingqin Lin, Santa Clara, CA (US); Fredrik Gunnarsson, Linköping (SE); Olof Liberg, Stockholm (SE); Sara Modarres Razavi, Linköping (SE); Henrik Rydén, Solna (SE); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/344,241

(22) PCT Filed: Nov. 14, 2017

(86) PCT No.: PCT/SE2017/051123
§ 371 (c)(1),
(2) Date: Apr. 23, 2019

(87) PCT Pub. No.: WO2018/093320
PCT Pub. Date: May 24, 2018

(65) Prior Publication Data
US 2019/0265326 A1      Aug. 29, 2019

Related U.S. Application Data

(60) Provisional application No. 62/424,003, filed on Nov. 18, 2016.

(51) Int. Cl.
*H04W 24/00* (2009.01)
*G01S 5/02* (2010.01)
*G01S 5/00* (2006.01)

(52) U.S. Cl.
CPC .......... *G01S 5/0236* (2013.01); *G01S 5/0036* (2013.01); *G01S 5/021* (2013.01); *G01S 5/0226* (2013.01); *H04W 24/00* (2013.01)

(58) Field of Classification Search
CPC ...... G01S 5/0236; G01S 5/0036; G01S 5/021; G01S 5/0226; H04W 64/00
See application file for complete search history.

(56) References Cited

U.S. PATENT DOCUMENTS

2012/0258730 A1   10/2012   Tinnakornsrisuphap et al.
2012/0258733 A1   10/2012   Fischer et al.
(Continued)

FOREIGN PATENT DOCUMENTS

WO   2016130285 A1   8/2016
WO   2016196431 A1   12/2016

OTHER PUBLICATIONS

International Search Report and Written Opinion dated Feb. 5, 2018 for International Application No. PCT/SE2017/051123 filed on Nov. 14, 2017, consisting of 18-pages.
(Continued)

*Primary Examiner* — Barry W Taylor
(74) *Attorney, Agent, or Firm* — Christopher & Weisberg. P. A.

(57) ABSTRACT

Embodiments of the disclosure provide methods and apparatus for positioning in a wireless network. One embodiment provides a method, performed by a target device, for enabling detection of a narrowband positioning reference signal, NPRS, location in a radio frame. The method includes: obtaining, from a location server, assistance data related to a neighbour cell in a reference and neighbour cell list. The assistance data incudes timing offset information for the neighbour cell; determining a time of a NPRS subframe for the neighbour cell and/or NPRS sequence based on the timing offset information; measuring a positioning reference signal (PRS) based on the determined time; and reporting the measured PRS to the location server.

11 Claims, 12 Drawing Sheets

(56) References Cited

U.S. PATENT DOCUMENTS

| | | | | |
|---|---|---|---|---|
| 2015/0018010 | A1* | 1/2015 | Fischer | H04W 76/28 455/456.2 |
| 2015/0365790 | A1 | 12/2015 | Edge et al. | |
| 2016/0195601 | A1 | 7/2016 | Siomina et al. | |
| 2016/0205651 | A1* | 7/2016 | Isa | H04W 4/70 455/456.1 |
| 2017/0238298 | A1* | 8/2017 | Wang | G01S 5/0236 455/452.1 |
| 2018/0049151 | A1* | 2/2018 | Yoon | G01S 5/0205 |
| 2018/0217228 | A1* | 8/2018 | Edge | G01S 5/0236 |
| 2019/0260534 | A1* | 8/2019 | Park | H04L 27/2613 |
| 2019/0297489 | A1* | 9/2019 | Lei | H04L 5/0051 |

OTHER PUBLICATIONS

International Preliminary Report on Patentability dated Feb. 25, 2019 for International Application No. PCT/SE2017/051123 filed on Nov. 14, 2017, consisting of 17-pages.

3GPP TSG RAN WG1 Meeting #87 R1-1611303; Title: RSTD Measurement and Reporting in NO-IoT; Agenda Item: 6.2.9.1.2; Source: Nokia, Alcatel-Lucent Shanghai Bell; Document for: Discussion and Decision; Location and Date: Reno, USA, Nov. 14-18, 2016, consisting of 2-pages.

3GPP TSG-RAN3 Meeting #94 R3-162770; Title: Positioning in NB-IoT enhancement; Agenda Item: 26.2; Source: Huawei, China Unicom; Document for: Discussion; Location and Date: Reno, Nevada, USA, Nov. 14-18, 2016, consisting of 2-pages.

3GPP TSG RAN WG1 Meeting #88 R1-1701752; Title: Remaining details of OTDOA assistance data; Agenda Item: 7.2.4.1.1; Source: Huawei, HiSilicon; Document for: Discussion and decision; Location and Date: Athens, Greece, Feb. 13-17, 2017, consisting of 4-pages.

Supplemental European Search Report dated Nov. 15, 2019 for EP 17871565 I filed on Nov. 14, 2017, consisting of 6-pages.

Sven Fischer: "Observed Time Difference of Arrival (OTDOA) Positioning in 3GPP LTE", Jun. 6, 2014 (Jun. 6, 2014), pp. 1-62, XP055549372, Retrieved from the Internet: URL: https://www.qualcomm.com/media/documents/files/otdoa-positioning-in-3gpp-lte.pdf [retrieved on Jan. 30, 2019 pp. 25, line 1-line7; consisting of 62 pages.

* cited by examiner

METHOD FOR DETECTION OF A NARROWBAND POSITIONING REFERENCE SIGNAL (NPRS) LOCATION IN A RADIO FRAME

CROSS-REFERENCE TO RELATED APPLICATIONS

This application is a Submission Under 35 U.S.C. § 371 for U.S. National Stage Patent Application of International Application No.: PCT/SE2017/051123, filed Nov. 14, 2017 entitled "METHOD FOR DETECTION OF A NARROWBAND POSITIONING REFERENCE SIGNAL (NPRS) LOCATION IN A RADIO FRAME," which claims priority to U.S. Provisional Application No. 62/424,003, filed Nov. 18, 2016, the entireties of both of which are incorporated herein by reference.

TECHNICAL FIELD

Embodiments herein relate to wireless communication systems, such as cellular networks. More specifically embodiments of the disclosure relate to a target device, a location server, a network node and methods performed therein.

BACKGROUND

The Internet of Things (IoT) is a vision for the future world where everything that can benefit from a connection will be connected. Cellular technologies are being developed or evolved to play an indispensable role in the IoT world, particularly the machine type communication (MTC). MTC is characterized by lower demands on data rates than for example mobile broadband, but with higher requirements on e.g. low cost device design, better coverage, and ability to operate for years on batteries without charging or replacing the batteries. To meet the IoT design objectives, 3GPP has standardized Narrowband IoT (NB-IoT) in Release 13 that has a system bandwidth of 180 kHz and targets improved coverage, long battery life, low complexity communication design, and network capacity that is sufficient for supporting a massive number of devices.

To further increase the market impact of NB-IoT, improving narrowband support for positioning has been agreed to be a key aspect of NB-IoT in Release 14 [1]. The enhancement will be designed to maintain the ultra-low cost and complexity of the Rel-13 NB-IoT UE where appropriate, as well as the coverage and capacity of the NB-IoT network.

Location-based services and emergency call positioning drive the development of positioning in wireless networks and a plethora of applications and services in terminals take advantage of knowledge of the terminal's position. Positioning in LTE is supported by the architecture in FIG. 1, with direct interactions between a UE and a location server (E-SMLC) via the LTE Positioning Protocol (LPP). Moreover, there are also interactions between the location server and the eNodeB via the LPPa protocol, to some extent supported by interactions between the eNodeB and the UE via the Radio Resource Control (RRC) protocol.

The following positioning techniques are considered in LTE (3GPP 36.305):

Enhanced Cell ID. Essentially cell ID information to associate the UE to the serving area of a serving cell, and then additional information to determine a finer granularity position.

Assisted GNSS. GNSS information retrieved by the UE, supported by assistance information provided to the UE from E-SMLC.

OTDOA (Observed Time Difference of Arrival). The UE estimates the time difference of reference signals from different base stations and sends to the E-SMLC for multilateration.

UTDOA (Uplink TDOA). The UE is requested to transmit a specific waveform that is detected by multiple location measurement units (e.g. an eNB) at known positions. These measurements are forwarded to E-SMLC for multilateration.

In a general scenario illustrated by FIG. 2, a UE A is served/controlled by a serving/controlling node. In addition, the UE A may also detect a signal from one or more non-serving/non-controlling nodes. The UE estimates the TOA of a signal from one node, possibly subject to an interfering signal from another node within coverage or communication range. Alternatively, significant interfering signals from other nodes may be avoided by employing a muting scheme where nodes alternate transmission and muting according to a schedule.

For example, the Observed Time Difference Of Arrival (OTDOA) method is a UE-assisted method, in which the UE measures the time of arrival (TOA) of specific positioning reference signals (PRS) from multiple cells (eNBs), and computes the relative differences between the TOAs for each cell and the TOA for a reference cell. These reference signal time differences (RSTDs) are quantized and reported via LPP to the E-SMLC together with an accuracy assessment. Based on the known positions of eNBs and their mutual time synchronization, it is possible for the E-SMLC to estimate the UE position from the RSTD and covariance reports using multilateration. The accuracy depends on the radio conditions of the received signals, the number of received signals, and also the deployment, which means that it will vary spatially. FIG. 3 illustrates the multilateration in OTDOA while considering eNB1 as the reference cell. eNB2 and eNB3 are referred to as neighbouring cells.

The positioning reference signals may be transmitted in the same carrier which the UE is currently operating on or carriers the UE is configured to use for communication, or at a different carrier. In case the UE is configured to measure a positioning reference signal at a different carrier, it can inform the serving eNB in order to obtain a measurement gap configuration, where the UE will leave a serving carrier to search for a positioning reference signal at a different carrier. The interactions with the serving eNB can be via the Radio Resource Control (RRC) protocol for example. In the existing LTE specification, the UE informs the serving eNB about the configured transmission pattern with which the positioning reference signal is being transmitted (typically periodic) and the frequency carrier.

While exploring the existing positioning solutions for NB-IoT, the downlink (DL) based positioning OTDOA is supported for Rel.14 positioning of NB-IoT, since the overhead of positioning reference signal does not need to scale with the number of UEs requiring positioning and thus it is a scalable solution.

Before the network node and the device in LTE start to communicate with each other they have to set their System Frame Number (SFN) and the subframe number to become synchronized with each other. This synchronization happens during cell search and timing synchronization procedures. In LTE, a radio frame a.k.a. system frame (numbered with SFN) has 10 ms length and the corresponding SFN can be an integer between 0 and 1023. A subframe has 1 ms length and the corresponding subframe number is an integer between 0 and 9. One radio frame comprises 10 subframes. Each subframe comprises 2 slots.

In the existing solution for legacy LTE, the device generally does not know the System Frame Number (SFN) or subframe number of the neighbour cells, but only the serving cell SFN or subframe number. To determine the SFN or subframe number of a neighbour cell the UE needs to read the system information of the neighbour cell, which is time and resource consuming but also may not be possible since the positioning reference signals from neighbour cells may be quite weak.

Based on the recent NB-IoT agreements, the device may not be able to determine the time resources with NPRS transmitted by neighbour cells, due to a large misalignment between different cells, or even determine the NPRS sequence if it is to be based on SFN or subframe number. This will make it impossible for the device to perform the positioning reference signal measurements for many reference-neighbour cell pairs with NB-IoT.

SUMMARY

It is an object of embodiments herein to enhance performance of a wireless communications network.

According to a first aspect of embodiments herein, the object is achieved by a method, performed by a target device, for enabling detection of a narrowband positioning reference signal (NPRS) location in a radio frame. The target device may obtain, from a location server, assistance data related to a neighbour cell in a reference and neighbour cell list. The assistance data comprises timing offset information for the neighbour cell. The target device may determine a time of a NPRS subframe for the neighbour cell and/or NPRS sequence based on the timing offset information. The target device may measure a positioning reference signal (PRS) based on the determined time. The target device may report the measured PRS to the location server.

According to a second aspect of embodiments herein, the object is achieved by a method, performed by a location server, for enabling detection of a NPRS location in a radio frame. The location server may obtain, from a network node, assistance data related to a neighbour cell in a reference and neighbour cell list. The assistance data comprises timing offset information for the neighbour cell. The location server may transmit, to the target device, the assistance data related to the reference and neighbour cell list. The location server may receive, from the target device, a measured PRS.

According to a third aspect of embodiments herein, the object is achieved by a method, performed by a network node, for enabling detection of a NPRS location in a radio frame. The network node may receive, from a location server, a request for assistance data related to a cell served by the network node. The network node may transmit, to the location server, the assistance data related to the cell served by the network node. The assistance data comprises timing offset information for the cell.

According to a fourth aspect of embodiments herein, the object is achieved by a target device, for enabling detection of a NPRS location in a radio frame. The target device may be configured to obtain, from a location server, assistance data related to a neighbour cell in a reference and neighbour cell list. The assistance data comprises timing offset information for the neighbour cell. The target device may be configured to, e.g. by means of a processing module or an obtaining module, obtain the assistance data. The target device may be configured to determine a time of a NPRS subframe for the neighbour cell and/or NPRS sequence based on the timing offset information. The target device may be configured to, e.g. by means of the processing module or a determining module, determine the time. The target device may be configured to measure a positioning reference signal (PRS) based on the determined time. The target device may be configured to, e.g. by means of the processing module, the determining module or a measuring module, measure the PRS. The target device may be configured to report the measured PRS to the location server. The obtaining module may comprise a transmitting module and/or a receiving module.

According to a fifth aspect of embodiments herein, the object is achieved by a location server, for enabling detection of a NPRS location in a radio frame. The location server may be configured to obtain, from a network node, assistance data related to a neighbour cell in a reference and neighbour cell list. The assistance data comprises timing offset information for the neighbour cell. The location server may be configured to, e.g. by means of a processing module or an obtaining module, obtain the assistance data. The location server may be configured to transmit, to a target device, the assistance data related to reference and neighbour cell list. The location server may be configured to, e.g. by means of the processing module or a transmitting module, transmit the assistance data. The location server may be configured to receive, from the target device, the measured PRS. The location server may be configured to, e.g. by means of the processing module or a receiving module, receive the measured PRS.

According to a sixth aspect of embodiments herein, the object is achieved by a network node, for enabling detection of a NPRS location in a radio frame. The network node may be configured to receive, from a location server, a request for assistance data related to a cell served by the network node. The network node may be configured to, e.g. by means of a processing module or a receiving module, receive the request for assistance data. The network node may be configured to transmit, to the location server, the assistance data related to the cell served by the network node. The network node may be configured to, e.g. by means of the processing module or a transmitting module, transmit the assistance data. The assistance data comprises timing offset information.

The embodiments herein may allow the target device, such as an NB-IoT device, to successfully detect the time, such as e.g. a location in a time frame, of NPRS subframes in different cells. Thereby ensuring that the target device can perform RSTD measurements. Hence, the risk that the NB-IoT device is not able to detect the time of NPRS subframe in different cells and will fail to perform RSTD measurements may be reduced. The embodiments herein may further be adapted according to the newly agreed NPRS configuration which has three different parts.

Definitions

BL Bandwidth reduced Low complexity
CE Coverage Extension
E-SMLC Evolved-Serving Mobile Location Centre
E-UTRAN Evolved UTRAN
GNSS Global Navigation Satellite System
LPP LTE Positioning Protocol
LTE Long Term Evolution
MBS Metropolitan Beacon System
NPRS Narrowband Positioning Reference Signal
NR New Radio (or 5G radio)

OTDOA Observed Time Difference Of Arrival
PRS Positioning Reference Signal
RRC Radio Resource Control
RSTD Reference Signal Time Difference
TDOA Time Difference of Arrival
TOA Time of Arrival
TP Transmission Point
UTRAN UMTS Terrestrial Radio Access Network

BRIEF DESCRIPTION OF THE DRAWINGS

Examples of embodiments herein are described in more detail with reference to the attached drawings in which.

DETAILED DESCRIPTION

Embodiments herein relate to an exchange of messages/indications between a target device, such as e.g. NB-IoT, and a network node in order to retrieve a NPRS location in a radio frame based on a reported timing offset for performing positioning reference signal measurements, from which for example the reference signal time difference (RSTD) may be determined. This may further be complemented with signaling between a positioning node, or location server, and a radio network node transmitting NPRS. The timing offset may comprise a subframe offset or a system frame number (SFN) offset, or both.

The target device may for example be a wireless communication device, a mobile station, a station (STA), a user equipment (UE) and/or a NB-IoT device.

The network node may for example be a radio network node such as a radio access node e.g., a Wi-Fi access point or a radio base station (RBS), which in some networks may also be denoted, for example, a "NodeB" or "eNodeB".

Three different alternative embodiments, which may herein also be referred to as parts, for NPRS configuration for NB-IoT devices have been agreed upon in Rel.14. Where the timing offset comprises a subframe offset, the definition of the subframe offset may be different for each embodiment. This aspect is described in greater detail below with respect to FIGS. 8 to 10. The target device may further require to receive the SFN offset for all the three different types of NPRS configuration. The SFN offset may define an offset in system frame number between a particular cell and a reference or serving cell.

Embodiments herein relate to a target device, a location server, a network node and methods therein, see FIG. 4, FIG. 5, FIG. 6, FIG. 11, FIG. 12 and FIG. 13. Dashed lines in the figures indicate that these boxes are optional.

Figure 1:
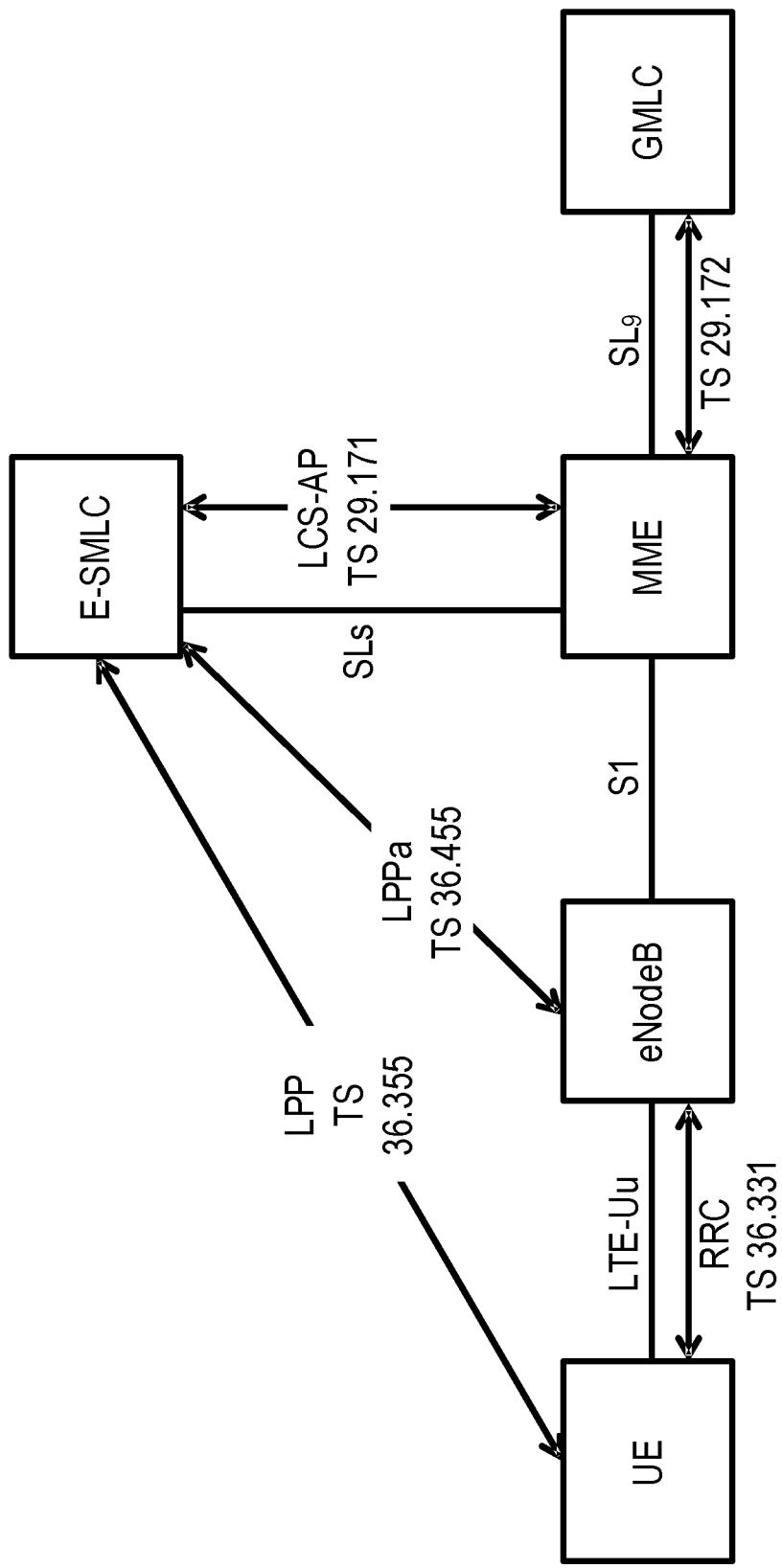
FIG. 1 is a schematic block diagram illustrating an architecture for LTE positioning.
Figure 2:
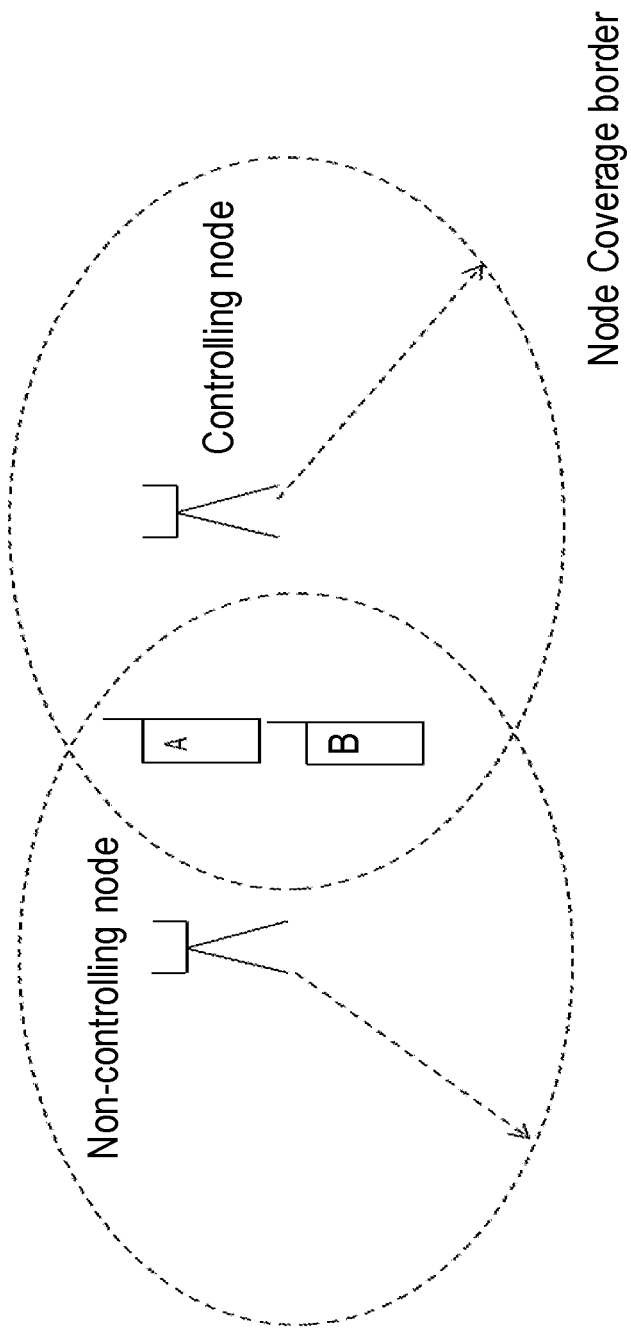
FIG. 2 is a schematic block diagram illustrating embodiments of a wireless communications network.
Figure 3:
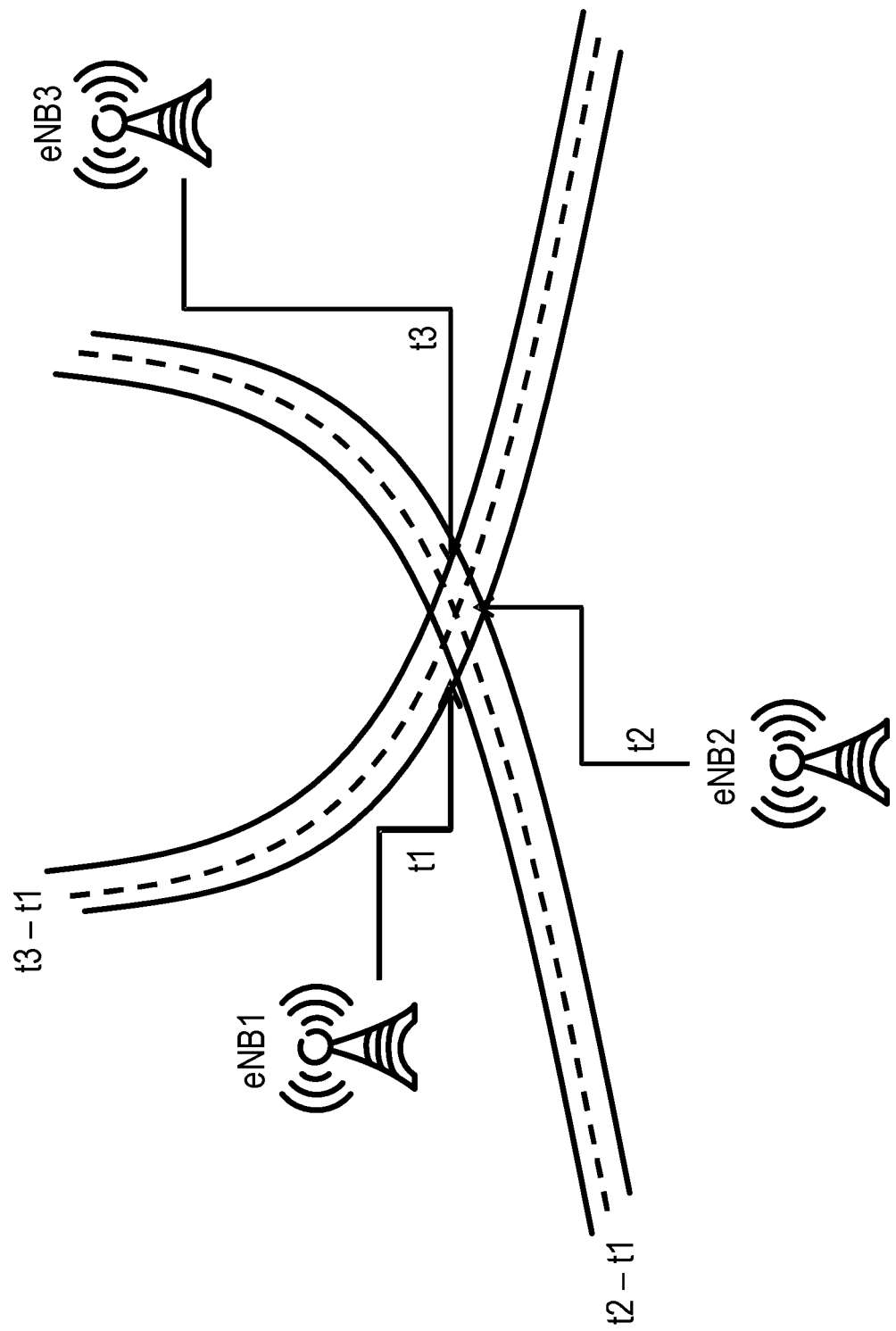
FIG. 3 is a schematic overview of OTDOA position estimation based on multilateration of RSTD measurements.
Figure 4:
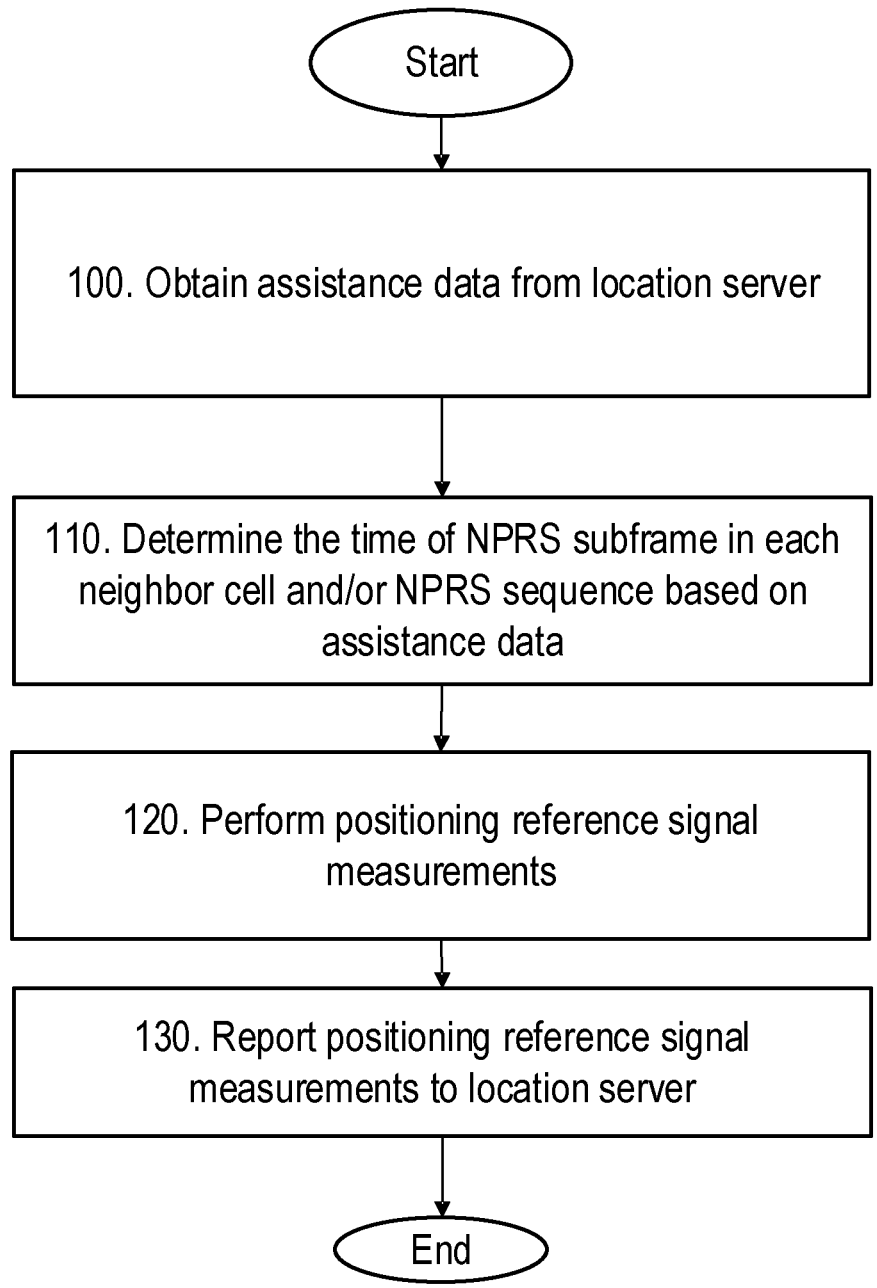
FIG. 4 is a flowchart depicting embodiments of a method performed in a target device.

A first aspect of embodiments relating to a method, performed by a target device (i.e. a wireless device which is the subject of a positioning method), for enabling detection of a NPRS location in a radio frame, will now be described with reference to the flowchart depicted in FIG. 4. The method may comprise the following actions, which actions may be taken in any suitable order.

Action 100: The target device may obtain, from the location server, assistance data, which may comprise NPRS configuration and timing offset information related to each cell within a reference and neighbour cell list. The timing offset information may comprise, e.g., SFN for a cell; SFN offset for a cell with respect to a reference time or another cell e.g. reference or serving cell; subframe offset for a cell with respect to a reference time of another cell e.g. reference or serving cell; or an indication whether for one, some, or all cells the timing offset information is the same as or different than that of a reference or serving cell. In a specific example, neighbour cells may be intra-frequency cells.

Action 110: The obtained assistance data, such as e.g. the timing offset information may be used by the target device to determine the time of NPRS subframe in each neighbour cell and/or NPRS sequence.

Action 120: The target device may perform positioning reference signal measurements based on the determined time of the NPRS subframe.

Action 130: The target device may report the positioning reference signal measurements to the location server.

In some embodiments, the positioning reference signal measurements may be represented by a Reference Signal Time Difference (RSTD) in the report to the location server. The actions performed by the target device are described in more detail in subsequent sections.

Figure 5:
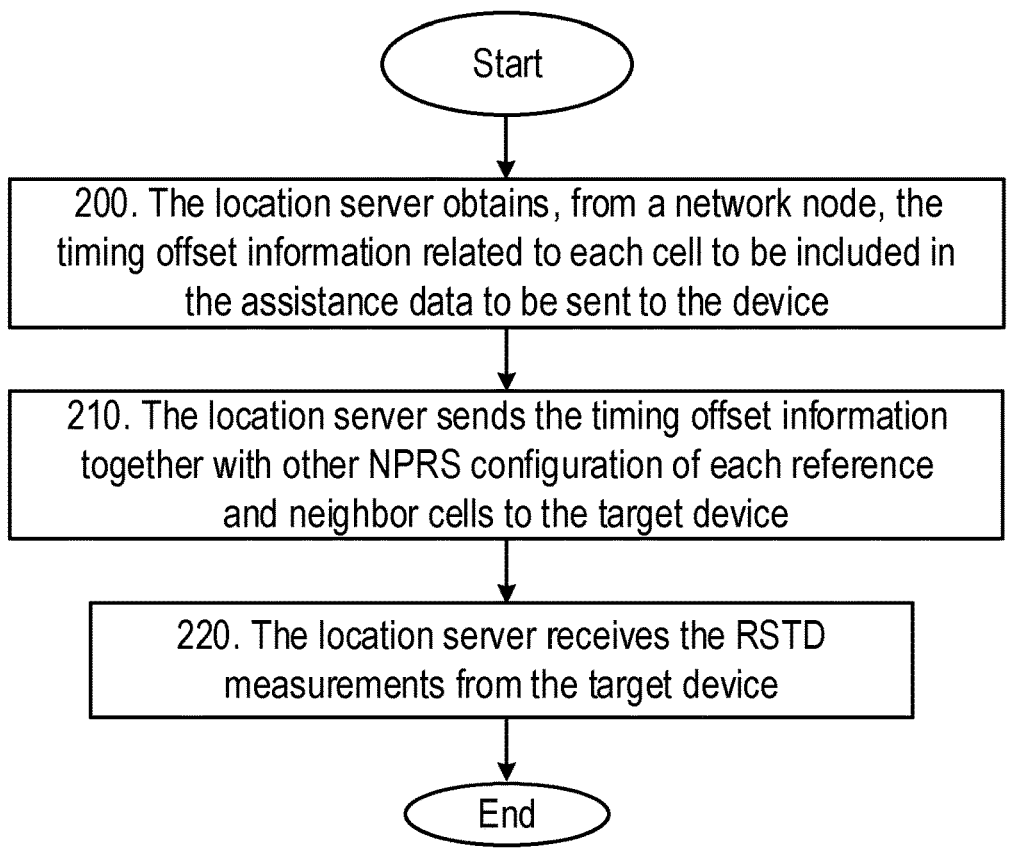
FIG. 5 is a flowchart depicting embodiments of a method performed in a location server.

A second aspect of embodiments relating to a method, performed by a location server, for enabling detection of a NPRS location in a radio frame by a target device, will now be described with reference to the flowchart depicted in FIG. 5. The method may comprise the following actions, which actions may be taken in any suitable order.

Action 200: The location server may obtain, from a network node, timing offset information related to a neighbour cell (e.g. a cell served by the network node) to be included in assistance data to be sent to a target device. The neighbour cell may belong to a reference and neighbour cell list. The timing offset information may comprise one or more of: SFN for the neighbour cell; SFN offset for the neighbour cell with respect to a reference time or another cell e.g. reference or serving cell; subframe offset for the neighbour cell with respect to a reference time of another cell e.g. reference or serving cell.

Action 210: The location server may send the assistance data, which may comprise the timing offset information together with other NPRS configuration of each reference and neighbour cell in the reference and neighbour cell list, to the target device. As noted above, this assistance data may be utilized by the target device to determine an NPRS location in a radio frame for the neighbour cell, and to measure the PRS transmitted by the network node.

Action 220: The location server may receive positioning reference signal measurements from the target device.

In one embodiment, the positioning reference signal measurements may be represented by RSTDs in the measurement reports. The different embodiments are further discussed in subsequent sections.

Figure 6:
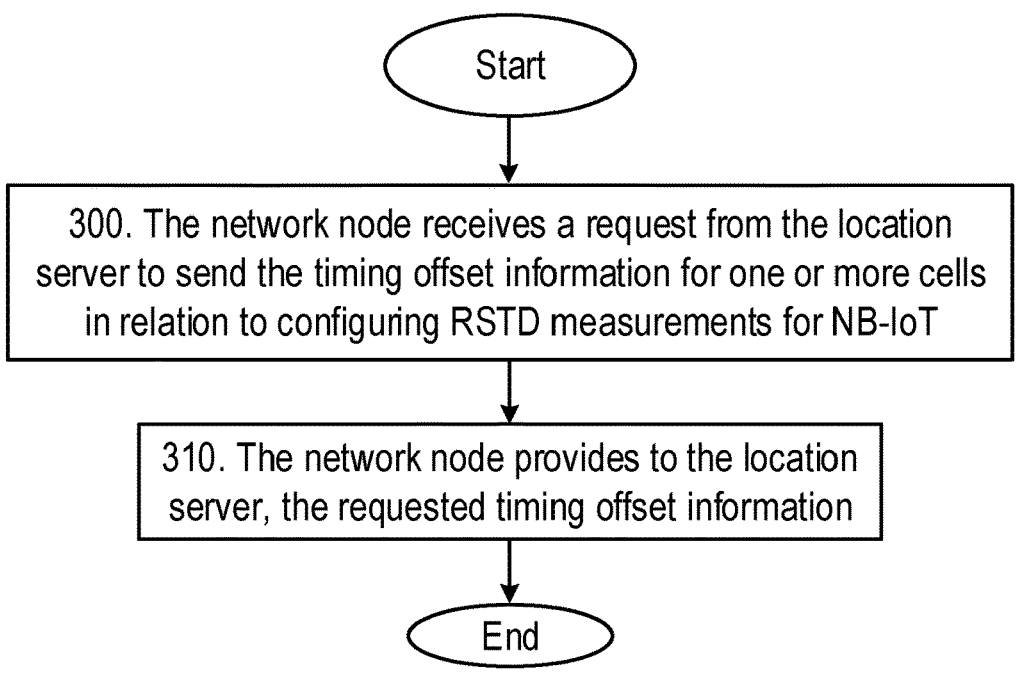
FIG. 6 is a flowchart depicting embodiments of a method performed in a network node.

A third aspect of embodiments relating to a method, performed by the network node, for enabling detection of a NPRS location in a radio frame by a target device, will now be described with reference to the flowchart depicted in FIG. 6. The method may comprise the following actions, which actions may be taken in any suitable order.

Action 300: The network node may receive a request from a location server for assistance data related to a cell served by the network node.

Action 310: The network node may provide to the location server, the requested assistance data for the cell served by the network node. The assistance data may comprise timing offset information, for example, SFN for the cell served by the network node; SFN offset for the cell with respect to a reference time or another cell e.g. reference or serving cell; subframe offset for the cell with respect to a reference time of another cell e.g. reference or serving cell. The assistance data may then be transmitted by the location server to the target device, to enable the target device to determine the NPRS location for the cell served by the network node.

The different embodiments are described in more detail in this section. The following has been agreed upon for time resource configuration of NPRS:

Configuration of time resources for NPRS
   Indication of exact subframes may be performed by:
     Example embodiment A/Part A: A bitmap indicating subframes which are not NB-IoT DL subframes (also referred to as invalid DL subframes).
       The bitmap may be of a fixed length of 10 bits. Alternatively, the bitmap may be of the same length as valid subframe configuration, such as e.g. 10 bits or 40 bits. In a further alternative, the bitmap may be of a fixed length of x bits, such as e.g., x=20.
     Example embodiment B/Part B: Indicated with one start subframe, one periodicity, and one number of repetitions for the occasions.
     Example embodiment C/Part C: A combination of Part A and Part B Subframe Offset Definition The definition of the subframe offset may be different for each part defined in the agreement, therefore here this definition is explained explicit to each part and compared with the legacy LTE case, in which this information was not required. Hence, in the following the subframe offset definition is explicitly discussed for each part of the agreement and compared with the legacy scenario.

In some embodiments, if the OTDOA assistance data further relates to positioning-only TPs or other radio nodes which may not be associated with any cell and/or may not transmit system information but may still transmit positioning signals, such as e.g., NPRS, one or more of the following solutions may be implemented:

Timing offset information may not be provided for these TPs. Instead, specific PRS configurations may be provided.
   a random number within an SFN or subframe range or an SFN or subframe offset range may be used as the SFN or subframe offset for these TPs.
   a pre-defined number within an SFN or subframe range or an SFN or subframe offset range may be used as the SFN or subframe offset for these TPs.
   a number derived based on a pre-defined rule may be used as the SFN or subframe offset for these TPs.
   a number received in or derived based on a message received from a network node may be used as the SFN or subframe offset for these TPs.

These numbers may then be used as timing offset information for nodes transmitting the positioning signals.

No Need for Subframe Offset for LTE

Figure 7:
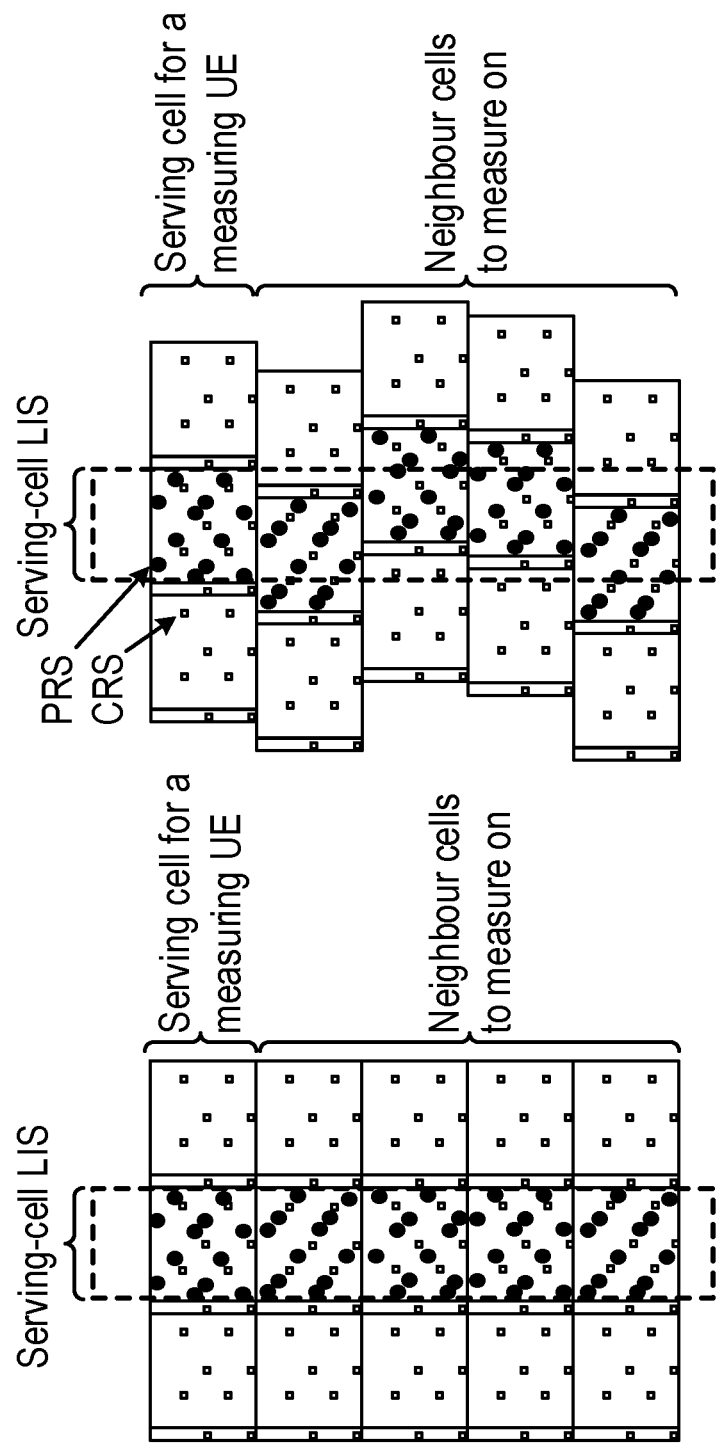
FIG. 7 is a schematic block diagram illustrating an ideal and a partial alignment of positioning subframes for LTE.

In LTE the maximum difference between the transmitted PRS positioning occasions cannot exceed half a subframe, which is less than 1 ms. Therefore even in the case where an ideal alignment is not considered, which is shown in the left picture in FIG. 7, it is still possible for the target device to determine the PRS subframe in both the reference cell and in the neighbour cells.

Subframe Offset for Part a NPRS Configuration

In Part A, the NPRS may be sent as a fixed length bitmap indicating subframes which are not NB-IoT DL subframes (also referred to as invalid DL subframes). While the target device is able to derive the subframes in which the NPRS is transmitted from such a bitmap, it is not possible for the target device to know the subframe offset between the two cells.

According to the large periodicity values considered for NB-IoT devices, the misalignment of subframes may not be in the scale of less than 1 ms, but may actually be 16 ms, which is an unneglectable value in terms of NPRS determination.

In one embodiment, the location server may send the subframe number and/or SFN of each cell along with the list of reference and neighbour cells. In another embodiment, the offset between the subframe numbers or SFNs of each cell in comparison to a reference cell may be reported to the target device. As the target device has the subframe number and SFN of the serving cell, one embodiment may be to consider that the reference cell in this context may be the serving cell.

Figure 8:
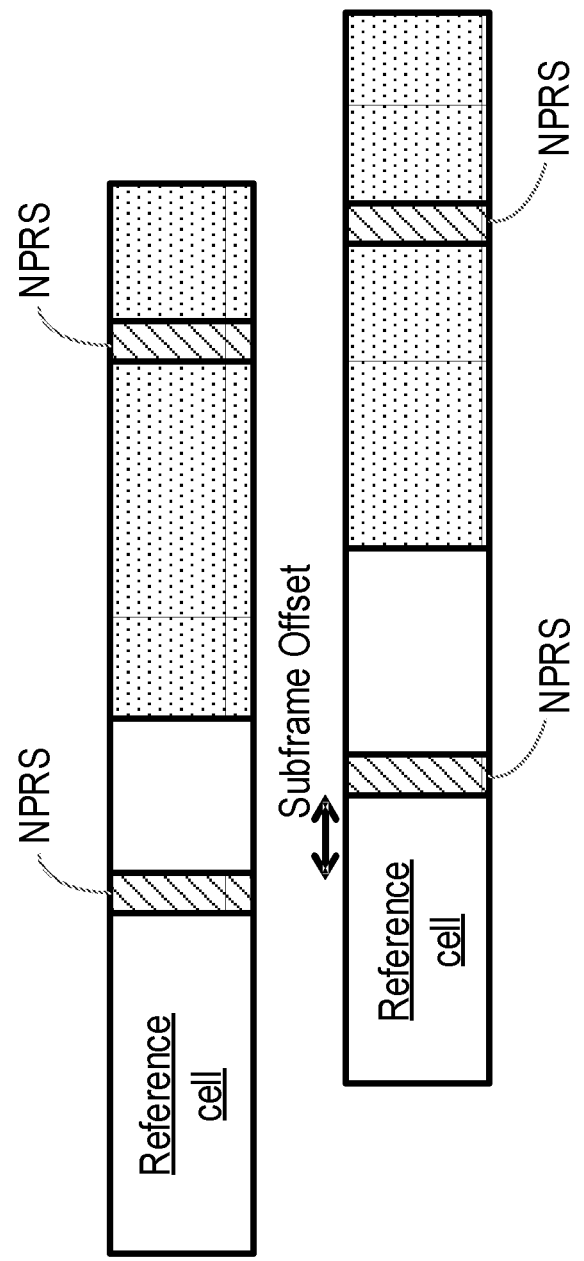
FIG. 8 is a schematic block diagram illustrating a timing offset according to a first configuration herein.

In FIG. 8, the NPRS is sent in the diagonally striped blocks in each PRS occasion for the reference cell in the upper line and for a neighbour cell in the lower line. The subframe offset is identified in the same figure as the time difference between the NPRS sent for the reference cell and the neighbour cell. Once the subframe offset is reported to the target device, the same value may be used for all PRS occasions.

Subframe Offset for Part B NPRS Configuration
Part B NPRS configuration may be defined as follows:
   Additionally or alternatively, an NB-loT device, such as a UE, may receive assistance information regarding 1-PRB NPRS
     For Part-B NB-IoT specific assistance information:
       Periodicity of NPRS occasion T: 160 ms, 320 ms, 640 ms, 1280 ms.
       Number of subframes of NPRS in one occasion:
         {20, 40, 80, 160} for 160 ms periodicity;
         {40, 80, 160, 320} for 320 ms periodicity;

{80, 160, 320, 640} for 640 ms periodicity;
{160, 320, 640, 1280} for 1280 ms periodicity.

For a given periodicity of NPRS occasion, the starting subframe offset of NPRS occasion=αT, α∈{0, ⅛, 2/8, 3/8, 4/8, 4/8, 6/8, 7/8, 1}

Although the subframe offset may be considered to be reported for a given periodicity, this may however still not fix the issue with SFN or subframe non alignment.

Accordingly, in one embodiment herein, as with the Part A embodiments described above, the location server may send the SFN or subframe number of each cell along with the list of reference and neighbour cells to the target device. In another embodiment, the offset between the SFN or subframe numbers of each cell in comparison to a reference cell may be reported to the target device. Since the target device has the SFN and subframe number of the serving cell, one embodiment may be to consider that the reference cell in this context would be the serving cell.

Figure 9:
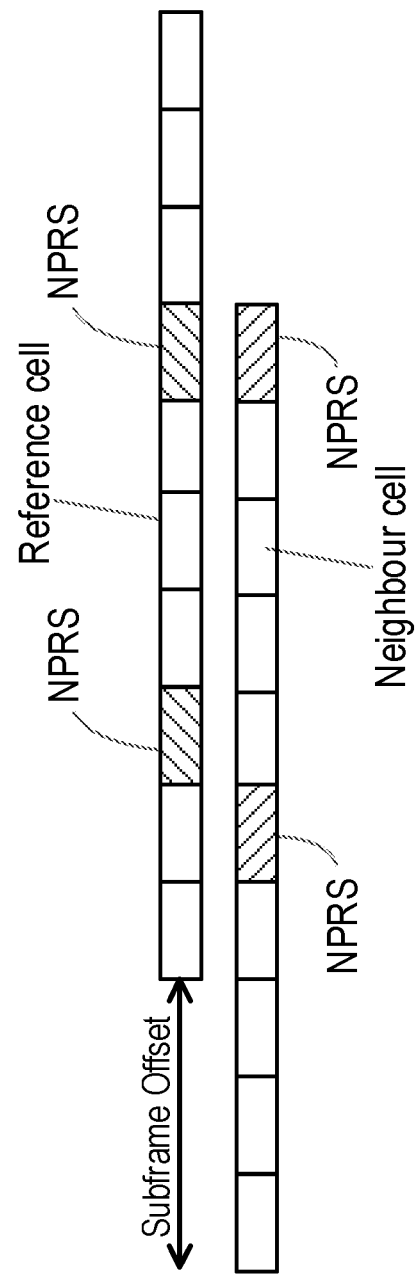
FIG. 9 is a schematic block diagram illustrating a timing offset according to a second configuration herein.

In FIG. 9, the NPRS is sent in the diagonally striped blocks for the first cell shown in the upper line, such as e.g. the reference cell, while NPRS is sent in the vertically striped blocks in a neighbour cell shown in the lower line. While according to Part B, the starting subframe offset may be reported to the target device (i.e. the subframe offset of an initial NPRS occasion), one or more of the subframe number or SFN offset may also be reported to the target device according to the FIG. 9. Once the subframe number or SFN offset is reported to the target device, the same value may be used in all PRS occasions.

Subframe Offset for Part C NPRS Configuration

Part C is a combination of Part A and Part B. Thus, a cell may be configured according to both Part A and Part B, with NPRS transmissions occurring in a particular subframe if one or both of the Part A and Part B configurations indicates so. In Part C each fixed-size bitmap (i.e. as defined above for Part A) may consist of a 10 bit bitmap. As with the discussion above, the target device in Part C is not aware of the SFN or subframe number offset between the cells. The value of the misalignment may herein also not be unneglectable, but may be at least 16 times more than what is possible in LTE.

In one embodiment herein, as with Part A and Part B embodiments described above, the location server may send one or more of the SFN and the subframe number of each cell along with the list of reference and neighbour cells to the target device. In another embodiment, one or more of the offsets between the SFN and the subframe number of each cell in comparison to a reference cell may be reported to the target device. Since the target device may have the SFN and subframe number of the serving cell, one embodiment may be to consider that the reference cell in this context may be the serving cell.

Figure 10:
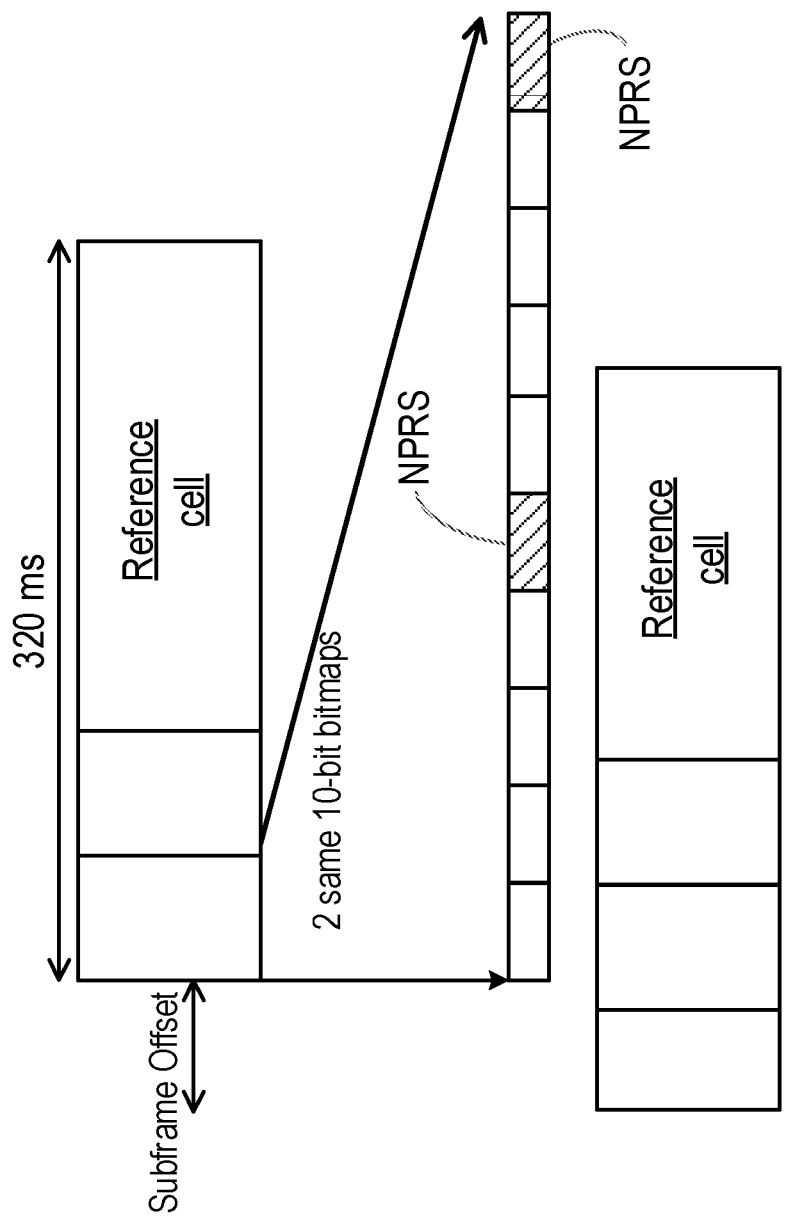
FIG. 10 is a schematic block diagram illustrating a timing offset according to a third configuration herein.

FIG. 10 exemplifies the SFN or subframe number offset for the Part C NPRS configuration. The NPRS are sent in some subframes included in the shaded blocks for the reference cell, while other bitmap configurations are used for the neighbour cell in the lower line. Once the SFN or subframe number offset is reported to the target device, the same value can be used in all PRS occasions.

Multiple PRS Configurations

Hitherto, the description has focused on one single PRS configuration. However, the target device may receive more than one PRS configuration.

In one mode, the target device may be configured with multiple PRS configurations, but only one set or piece of timing offset information for a specific entity, such as e.g a node, a cell, a transmission point, etc, which implies that the set or piece of timing offset information may be considered or indicated as applicable to all PRS configurations (e.g., together with pre-configured offsets). For example, the offset may be based on the type of the LTE narrowband technique that the PRS configuration is associated with.

In another mode, one of the PRS configurations may be utilized for NB-IoT transmissions, and another of the PRS configurations may relate to LTE or narrowband versions of LTE with specific focus on bandwidth reduced low complexity (BL) devices, possibly also with coverage extension (CE) components such as repetitions of signals and data.

Figure 11:
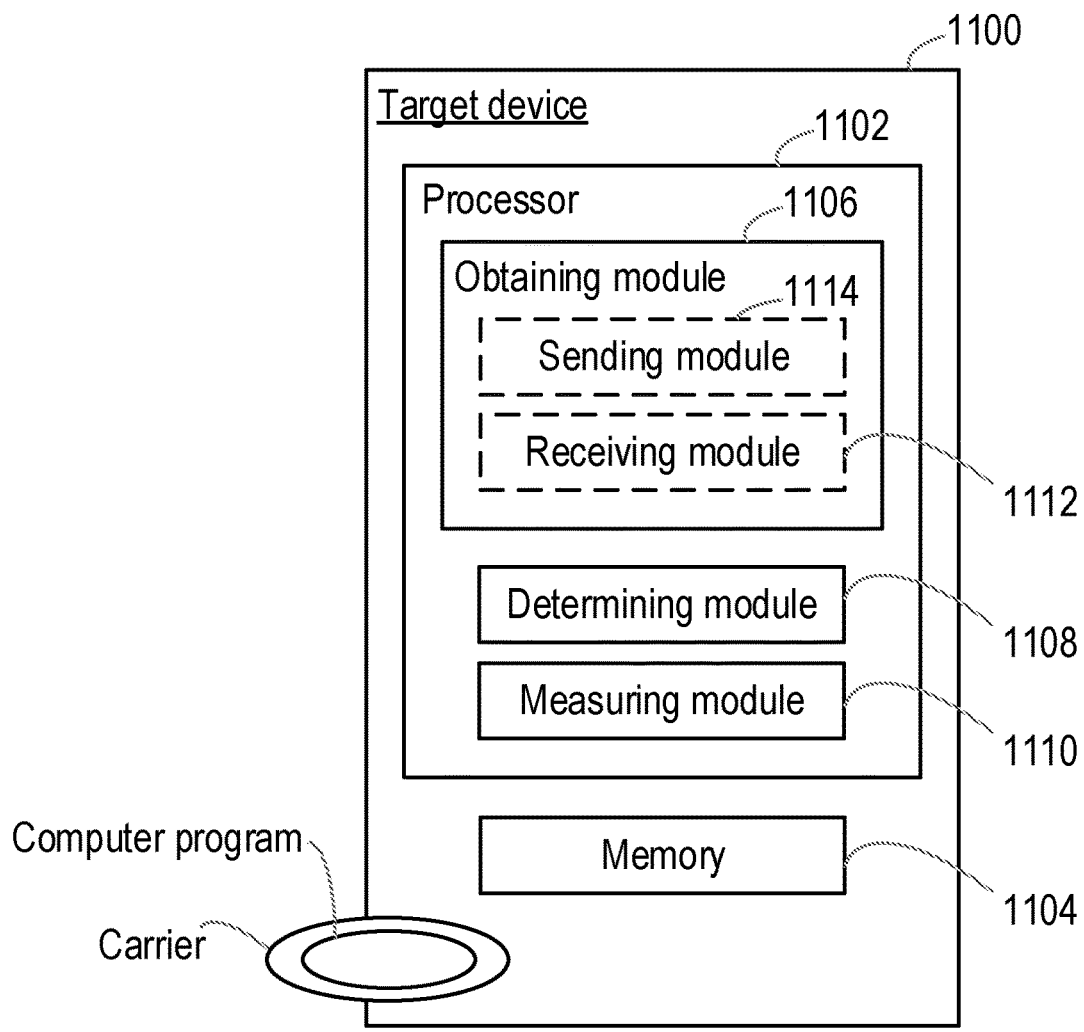
FIG. 11 is a schematic block diagram illustrating a target device according to embodiments of the disclosure.

FIG. 11 is a schematic illustration of a target device 1100 according to embodiments of the disclosure. The target device 1100 comprises a processor 1102, and memory 1104. Embodiments described herein (e.g. the method described above with respect to FIG. 4) may be implemented through the processor 1102 executing computer program code stored on the memory 1104 for performing the methods set out herein.

The processor 1102 may comprise one or more modules for performing the methods set out herein. For example, the processor 1102 may comprise an obtaining module 1106, a determining module 1108 and a measuring module 1110. The obtaining module 1106 may be configured to obtain, from a location server, assistance data related to a neighbour cell in a reference and neighbour cell list. The assistance data may comprise timing offset information for the neighbour cell, such as an SFN offset and/or a subframe offset. The obtaining module 1106 may comprise a receiving module 1112 for receiving the timing offset information from the location server. The determining module 1108 may be configured to determine a time of a NPRS subframe for the neighbour cell and/or a NPRS sequence based on the timing offset information. The measuring module 1110 may be configured to measure a positioning reference signal (PRS) or NPRS based on the determined time. The obtaining module 1106 may comprise a sending module 1114 configured to report the measured PRS to the location server.

The computer code may be provided as a computer program product, for instance in the form of a data carrier carrying computer program code for performing the methods described above (e.g. with respect to FIG. 4); the computer code may be provided to or downloaded by the target device 1100.

The memory 1104 may be arranged to be used to store obtained information such as assistance data, timing offset information, other NPRS configuration, indications of a mobility set, identifiers of APs and WLANs, identifiers of UEs, ciphering keys, measurements of signals from radio access nodes, measurement reports or parts thereof and applications etc. to perform the methods herein when being executed in the target device 1100.

Figure 12:
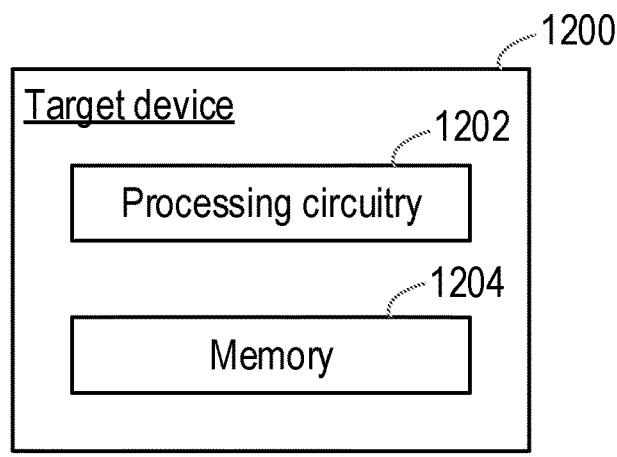
FIG. 12 is a schematic block diagram illustrating a target device according to further embodiments of the disclosure.

FIG. 12 is a schematic illustration of a target device 1200 according to embodiments of the disclosure. The target device 1200 comprises processing circuitry 1202, and memory 1204. Embodiments described herein (e.g. the method described above with respect to FIG. 4) may be implemented through the processing circuitry 1202 executing computer program code stored on the memory 1204 for performing the methods set out herein.

Figure 13:
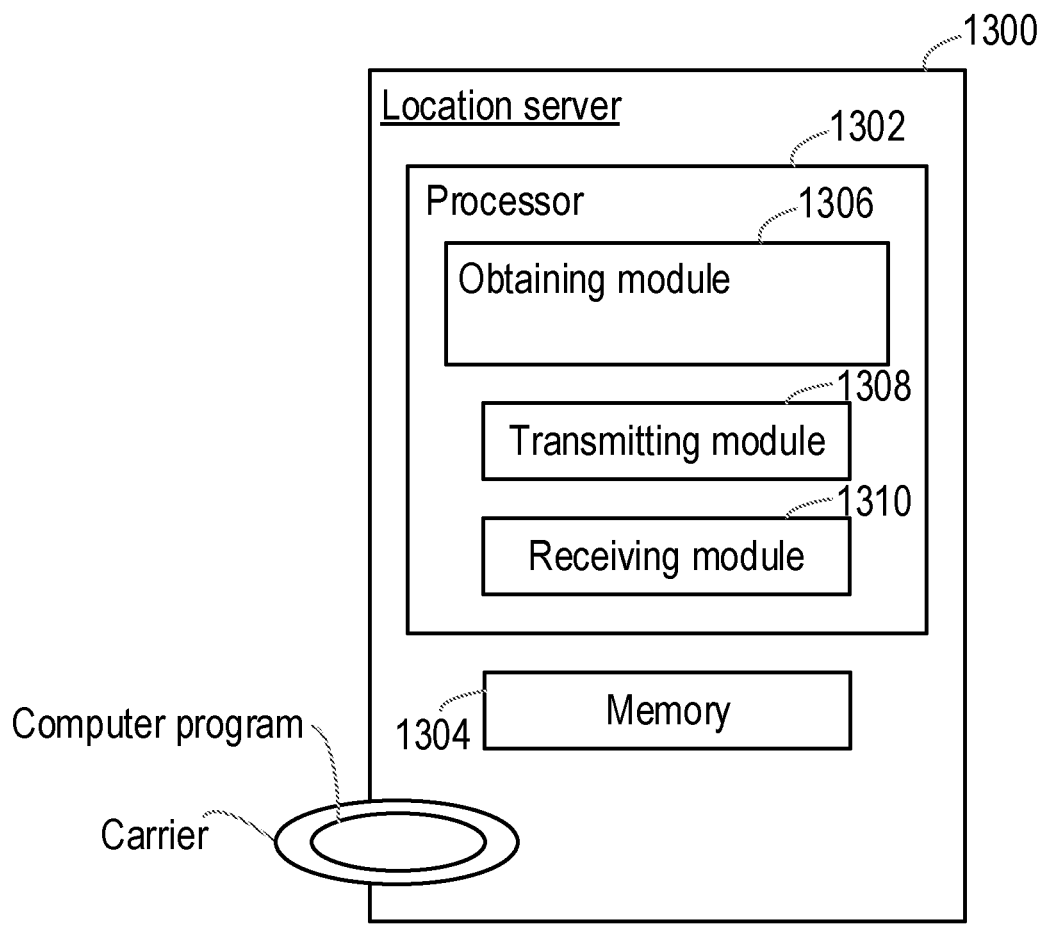
FIG. 13 is a schematic block diagram illustrating a location server according to embodiments of the disclosure.

FIG. 13 is a schematic illustration of a location server 1300 according to embodiments of the disclosure. The location server 1300 comprises a processor 1302, and memory 1304. Embodiments described herein (e.g. the method described above with respect to FIG. 5) may be implemented through the processor 1302 executing computer program code stored on the memory 1304 for performing the methods set out herein.

The processor 1302 may comprise one or more modules for performing the methods set out herein. For example, the processor 1302 may comprise an obtaining module 1306, a transmitting module 1308 and a receiving module 1310. The obtaining module 1306 may be configured to obtain, from a network node, assistance data related to a neighbour cell in a reference and neighbour cell list, wherein the assistance data comprises timing offset information for the neighbour cell. The transmitting module 1308 may be configured to transmit, to a target device, the assistance data related to the reference and neighbour cell list. The receiving module 1310 may be configured to receive, from the target device, a measured positioning reference signal, or a report relating to a measured positioning reference signal.

The computer code may be provided as a computer program product, for instance in the form of a data carrier carrying computer program code for performing the methods described above (e.g. with respect to FIG. 5); the computer code may be provided to or downloaded by the location server 1300.

The memory 1304 may be arranged to be used to store obtained information such as assistance data, timing offset information, other NPRS configuration, indications of a mobility set, identifiers of APs and WLANs, identifiers of UEs, ciphering keys, measurements of signals from radio access nodes, measurement reports or parts thereof and applications etc. to perform the methods herein when being executed in the location server 1300.

In some embodiments the location server 1300 may be embodied in a network node.

Figure 14:
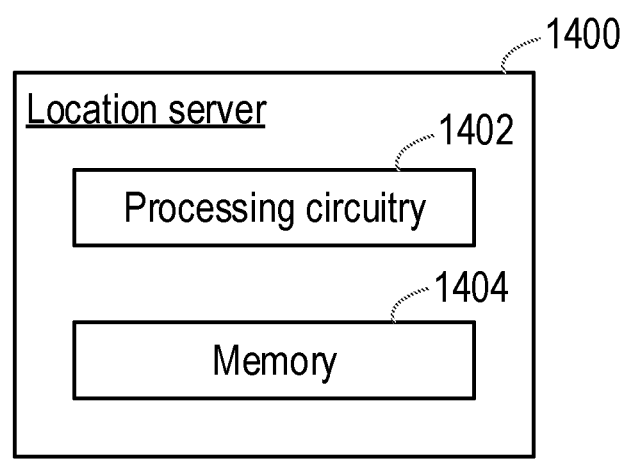
FIG. 14 is a schematic block diagram illustrating a location server according to further embodiments of the disclosure.

FIG. 14 is a schematic illustration of a location server 1400 according to embodiments of the disclosure. The location server 1400 comprises processing circuitry 1402, and memory 1404. Embodiments described herein (e.g. the method described above with respect to FIG. 5) may be implemented through the processing circuitry 1402 executing computer program code stored on the memory 1404 for performing the methods set out herein.

Figure 15:
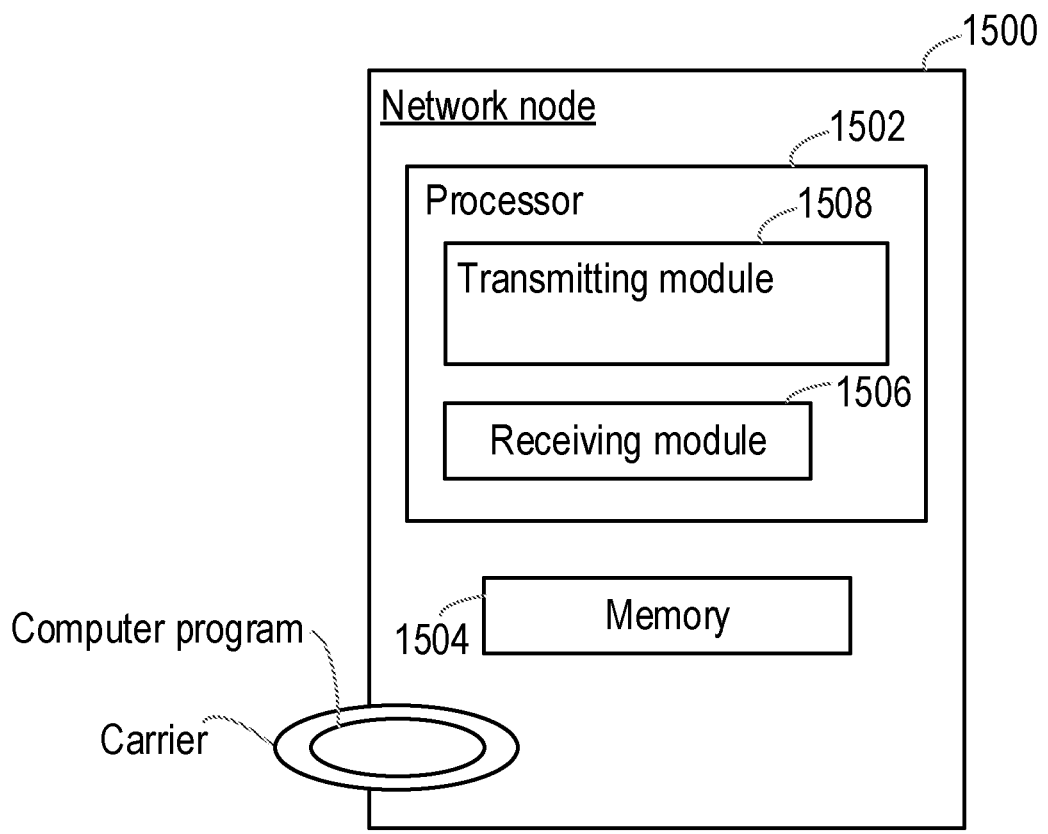
FIG. 15 is a schematic block diagram illustrating a network node according to embodiments of the disclosure.

FIG. 15 is a schematic illustration of a network node 1500 (e.g. a radio access network node such as a base station or eNB, etc) according to embodiments of the disclosure. The network node 1500 comprises a processor 1502, and memory 1504. Embodiments described herein (e.g. the method described above with respect to FIG. 6) may be implemented through the processor 1502 executing computer program code stored on the memory 1504 for performing the methods set out herein.

The processor 1502 may comprise one or more modules for performing the methods set out herein. For example, the processor 1502 may comprise a receiving module 1506 and a transmitting module 1508. The receiving module 1506 may be configured to receive, from a location server, a request for assistance data related to a cell served by the network node. The transmitting module 1508 may be configured to transmit, to the location server, the assistance data related to the cell served by the network node, wherein the assistance data comprises timing offset information for the cell.

The computer code may be provided as a computer program product, for instance in the form of a data carrier carrying computer program code for performing the methods described above (e.g. with respect to FIG. 6); the computer code may be provided to or downloaded by the network node 1500.

The memory 1504 may be arranged to be used to store obtained information such as assistance data, timing offset information, other NPRS configuration, indications of a mobility set, identifiers of APs and WLANs, identifiers of UEs, ciphering keys, measurements of signals from radio access nodes, measurement reports or parts thereof and applications etc. to perform the methods herein when being executed in the network node 1500.

Figure 16:
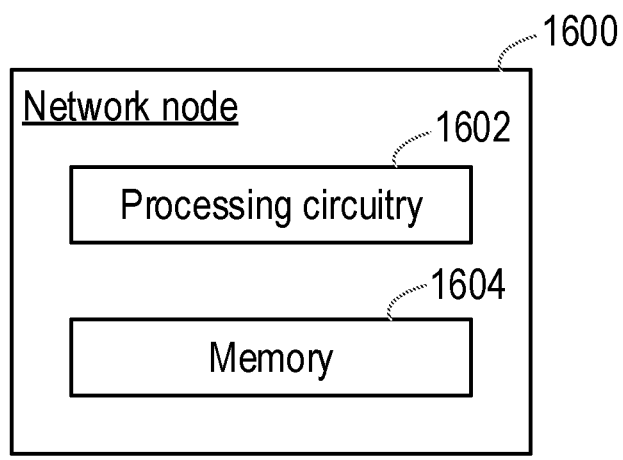
FIG. 16 is a schematic block diagram illustrating a network node according to further embodiments of the disclosure.

FIG. 16 is a schematic illustration of a network node 1600 according to embodiments of the disclosure. The network node 1600 comprises processing circuitry 1602, and memory 1604. Embodiments described herein (e.g. the method described above with respect to FIG. 6) may be implemented through the processing circuitry 1602 executing computer program code stored on the memory 1604 for performing the methods set out herein.

Thus, the methods according to the embodiments described herein performed by the UE and/or the network node may be implemented by means of a computer program product, comprising instructions, i.e. software code portions, which, when executed on at least one processor, cause the at least one processor to carry out the actions described herein, as performed by the target device and/or the location server and/or the network node. The computer program product may be stored on a computer-readable storage medium. The computer-readable storage medium, having stored there on the computer program, may comprise the instructions which, when executed on at least one processor, cause the at least one processor to carry out the actions described herein, as performed by the target device and/or the location server and/or the network node. In some embodiments, the computer-readable storage medium may be a non-transitory computer-readable storage medium.

The invention claimed is:

1. A method, performed by a target device, for enabling detection of a narrowband positioning reference signal, NPRS, location in a radio frame, wherein the method comprises:
    obtaining, from a location server, assistance data related to a neighbour cell in a reference and neighbour cell list, the assistance data comprising:
        a NPRS configuration of each cell in the reference and neighbor cell list, the NPRS configuration indicating NPRS subframes by indicating one of:
            invalid downlink subframes; and
            a start subframe, a periodicity and a number of repetitions associated with NPRS occasions; and
        timing offset information for the neighbour cell, the timing offset information comprising an indication of a system frame number, SFN, offset between the neighbour cell and a serving cell acting as a reference cell;
    determining at least one from the group consisting of a time of a NPRS subframe for the neighbour cell and a NPRS sequence based on the NPRS configuration for the neighbor cell and the timing offset information;
    measuring a NPRS for the neighbour cell based on the determined time; and
    reporting the measured NPRS to the location server.

2. The method according to claim 1, wherein the timing offset information comprises an indication of a subframe number offset between the neighbour cell and one of:
    a reference cell; and
    a serving cell.

3. The method according to claim 2, wherein the timing offset information further comprises an indication as to whether the timing offset information of the neighbour cell is the same as or different than the timing offset information of one of:
the reference cell; and
the serving cell.

4. The method according to claim 1, wherein the timing offset information comprises an indication as to whether the timing offset information of the neighbour cell is the same as or different than the timing offset information of one of:
a reference cell; and
a serving cell.

5. A method, performed by a location server, for enabling detection of a narrowband positioning reference signal, NPRS, location in a radio frame, the method comprising:
obtaining, from a network node, assistance data related to a neighbour cell in a reference and neighbour cell list, wherein the assistance data comprising:
a NPRS configuration of each cell in the reference and neighbor cell list, the NPRS configuration indicating NPRS subframes by indicating one of:
invalid downlink subframes; and
a start subframe, a periodicity and a number of repetitions associated with NPRS occasions; and
timing offset information for the neighbour cell, the timing offset information comprising an indication of a system frame number, SFN, offset between the neighbour cell and a serving cell acting as a reference cell;
transmitting, to a target device, the assistance data related to the reference and neighbour cell list for enabling detection of the NPRS location in the radio frame for measurement; and
receiving, from the target device, a measured NPRS.

6. The method according to claim 5, wherein the timing offset information comprises an indication of a subframe number offset between the neighbour cell and one of:
a reference cell; and
a serving cell.

7. The method according to claim 5, wherein the timing offset information comprises an indication as to whether the timing offset information of the neighbour cell is the same as or different than the timing offset information of one of:
a reference cell; and
a serving cell.

8. A method, performed by a network node, for enabling detection of a narrowband positioning reference signal, NPRS, location in a radio frame, the method comprising:
receiving, from a location server, a request for assistance data related to a neighbour cell in a reference and neighbour cell list and served by the network node; and
transmitting, to the location server for communication to a target device, the assistance data related to the neighbour cell served by the network node, the assistance data comprising:
a NPRS configuration of each cell in the reference and neighbor cell list, the NPRS configuration indicating NPRS subframes by indicating one of:
invalid downlink subframes; and
a start subframe, a periodicity and a number of repetitions associated with NPRS occasions; and
timing offset information for the cell for enabling detection of the NPRS location in the radio frame for measurement, the timing offset information comprising an indication of a system frame number, SFN, offset between the neighbour cell and a serving cell acting as a reference cell.

9. A target device, for enabling detection of a narrowband positioning reference signal, NPRS, location in a radio frame, the target device being configured to:
obtain, from a location server, assistance data related to a neighbour cell in a reference and neighbour cell list, the assistance data comprising:
a NPRS configuration of each cell in the reference and neighbor cell list, the NPRS configuration indicating NPRS subframes by indicating one of:
invalid downlink subframes; and
a start subframe, a periodicity and a number of repetitions associated with NPRS occasions; and
timing offset information for the neighbour cell, the timing offset information comprising an indication of a system frame number, SFN, offset between the neighbour cell and a serving cell acting as a reference cell;
determine at least one from the group consisting of a time of a NPRS subframe for the neighbour cell and NPRS sequence based on the NPRS configuration for the neighbor cell and the timing offset information;
measure a NPRS of the neighbour cell based on the determined time; and
report the measured NPRS to the location server.

10. A location server, for enabling detection of a narrowband positioning reference signal, NPRS, location in a radio frame, the location server being configured to:
obtain, from a network node, assistance data related to a neighbour cell in a reference and neighbour cell list, the assistance data comprises comprising:
a NPRS configuration of each cell in the reference and neighbor cell list, the NPRS configuration indicating NPRS subframes by indicating one of:
invalid downlink subframes; and
a start subframe, a periodicity and a number of repetitions associated with NPRS occasions; and
timing offset information for the neighbour cell, the timing offset information comprising an indication of a system frame number, SFN, offset between the neighbour cell and a serving cell acting as a reference cell;
transmit, to a target device, the assistance data related to reference and neighbour cell list for enabling detection of the NPRS location in the radio frame for measurement; and
receive, from the target device, measured NPRS.

11. A network node, for enabling detection of a narrowband positioning reference signal, NPRS, location in a radio frame, the network node being configured to:
receive, from a location server, a request for assistance data related to a neighbour cell in a reference and neighbour cell list; and
transmit, to the location server for communication to a target device, the assistance data related to the neighbour cell served by the network node, the assistance data comprising:
a NPRS configuration of each cell in the reference and neighbor cell list, the NPRS configuration indicating NPRS subframes by indicating one of:
invalid downlink subframes; and
a start subframe, a periodicity and a number of repetitions associated with NPRS occasions; and
timing offset information for the neighbour cell for enabling detection of the NPRS location in the radio frame for measurement, the timing offset information comprising an indication of a system frame number, SFN, offset between the neighbour cell and a serving cell acting as a reference cell.

* * * * *